United States Patent [19]

Grube et al.

[11] 4,168,668
[45] Sep. 25, 1979

[54] VEHICLE TIEDOWN WINCH

[75] Inventors: William L. Grube, Lake Bluff; Allen D. Siblik, Lindenhurst, both of Ill.

[73] Assignee: MacLean Fogg Company, Mundelein, Ill.

[21] Appl. No.: 760,928

[22] Filed: Jan. 21, 1977

[51] Int. Cl.² .................. B60P 7/08; B61D 45/00; B66D 1/30; B66D 5/32
[52] U.S. Cl. .................. 105/477; 105/368 T; 105/473; 248/499; 254/51; 254/161
[58] Field of Search ............ 105/368-T, 477, 473; 108/55.1, 55.3; 209/335; 220/1.5; 248/119 R, 499, 500, 503; 254/161, 164, 165, 51; 280/179 A

[56] References Cited

U.S. PATENT DOCUMENTS

| | | | |
|---|---|---|---|
| 3,564,577 | 2/1971 | Blunden et al. | 105/477 |
| 3,650,222 | 3/1972 | Broling et al. | 105/477 |
| 3,673,969 | 7/1972 | Peisner et al. | 105/368 T X |
| 3,679,175 | 7/1972 | Drayton | 105/368 T X |
| 3,841,235 | 10/1974 | Wheeler et al. | 105/368 T |
| 3,842,754 | 10/1974 | Jones | 105/368 T |
| 4,044,691 | 8/1977 | Kilgus et al. | 105/477 X |

Primary Examiner—Albert J. Makay
Assistant Examiner—Howard Beltran
Attorney, Agent, or Firm—Mason, Kolehmainen, Rathburn & Wyss

[57] ABSTRACT

A tiedown winch for securing a load such as an automobile to a transporting vehicle such as a railroad car includes a housing slidable in a channel track carried by the transporting vehicle. A chain for securing the load is wound on a drum journalled in top and bottom walls of the housing for rotation around a vertical axis. Both end walls of the housing are provided with openings so that the chain can extend from the housing in either direction, and the openings include contiguous segments in the bottom wall to decrease the height of the housing. The top wall or cover of the housing is hinged for access to the drum, and a single locking mechanism is provided for the cover and for securing the housing against sliding in the track. In an intermediate position, the locking mechanism permits the housing to slide freely while the cover is held closed.

14 Claims, 13 Drawing Figures

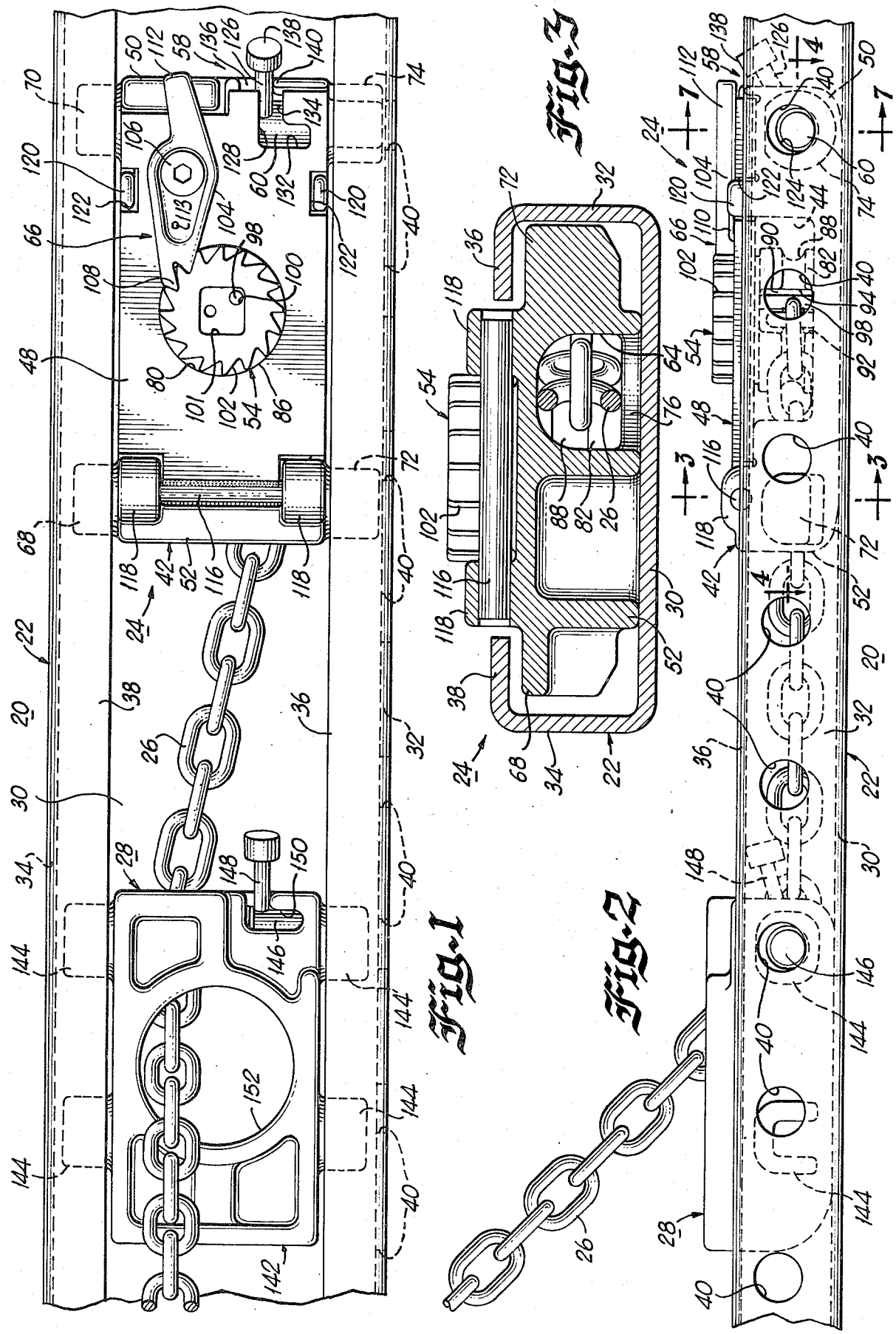

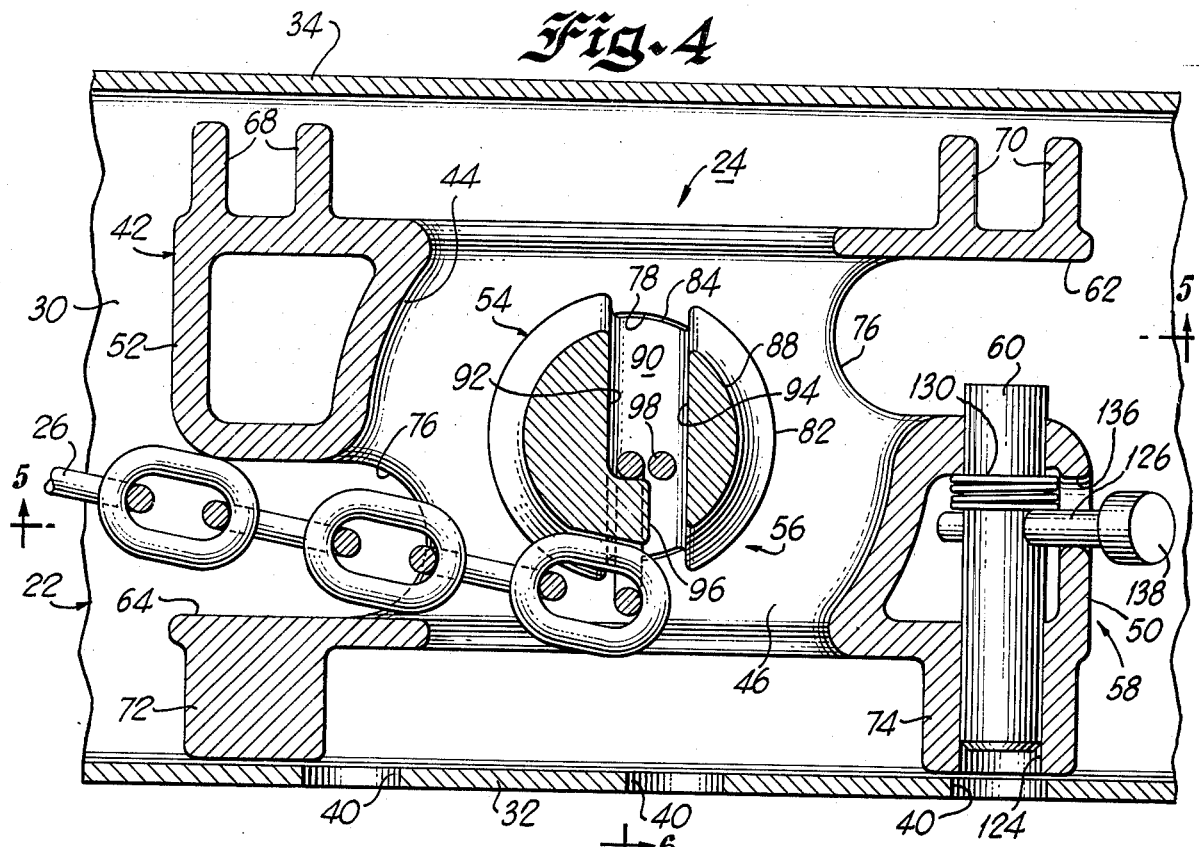
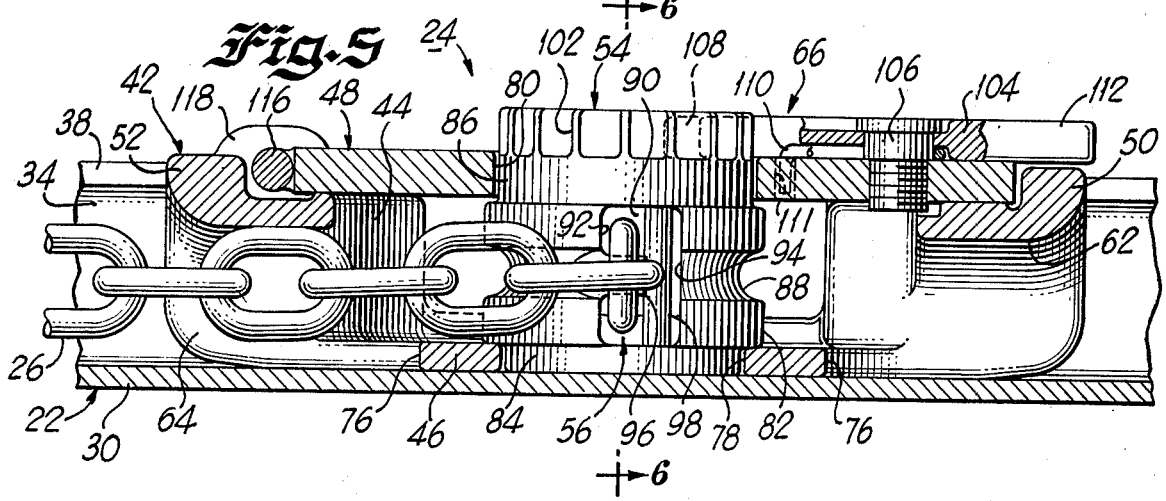
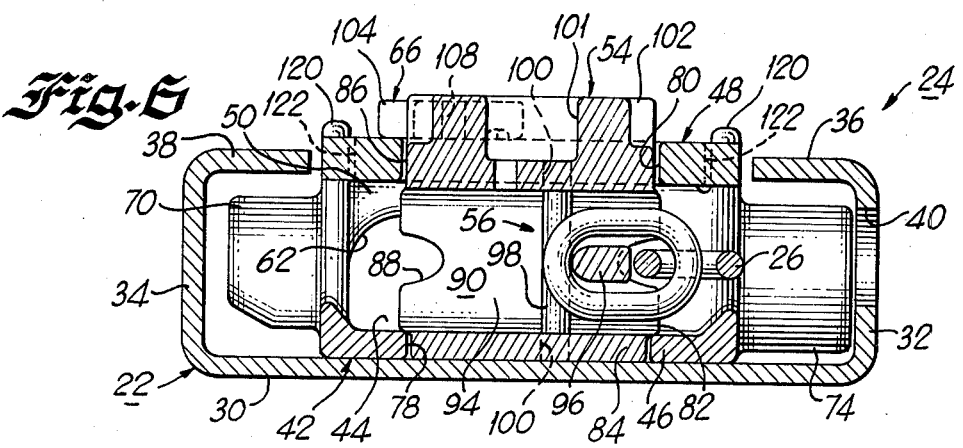

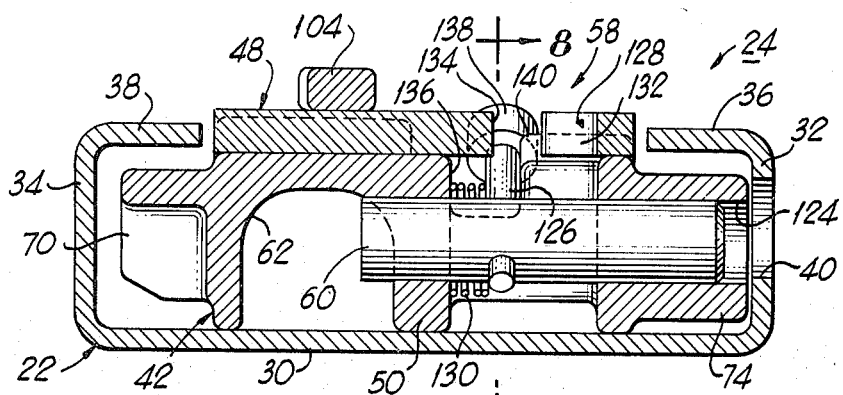
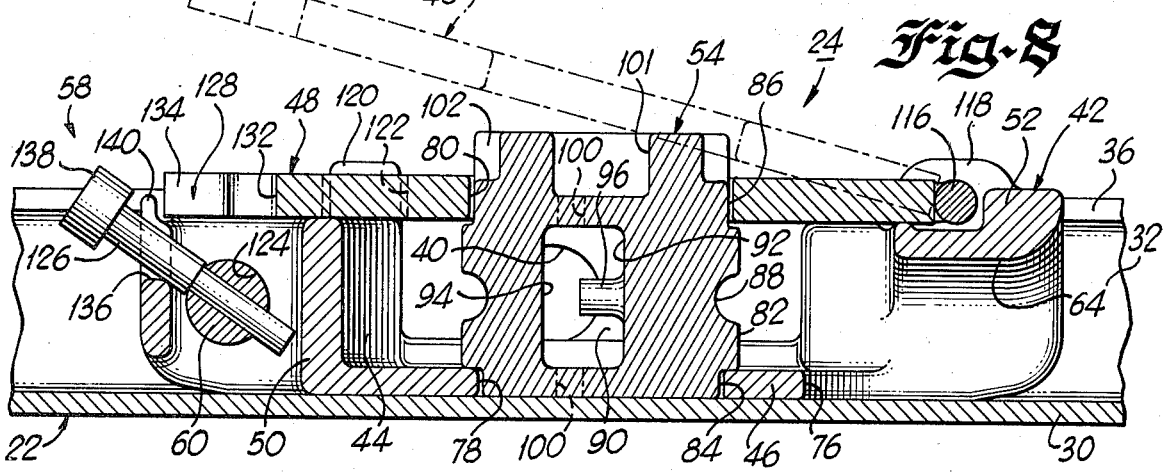
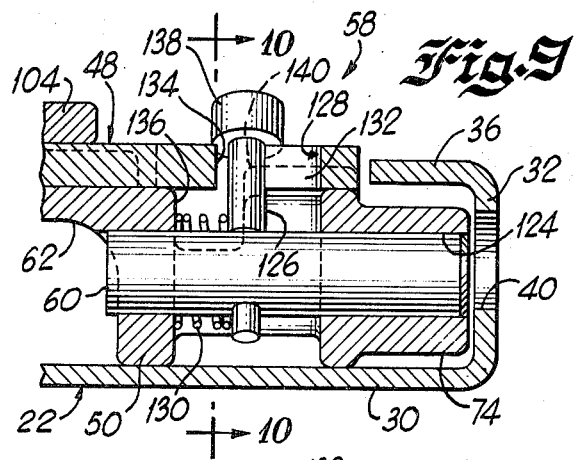
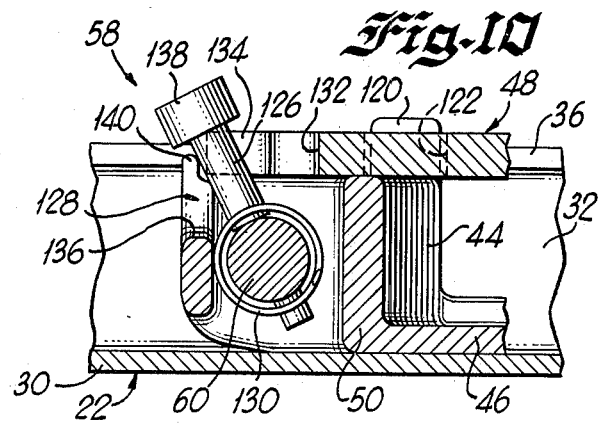
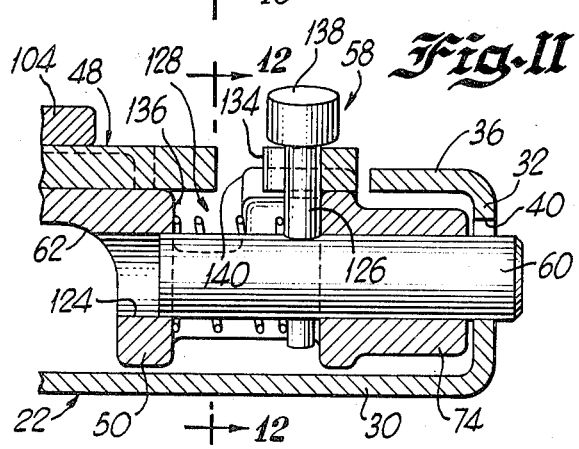
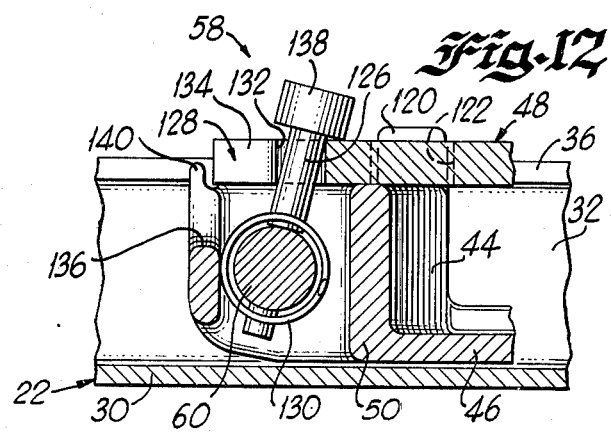

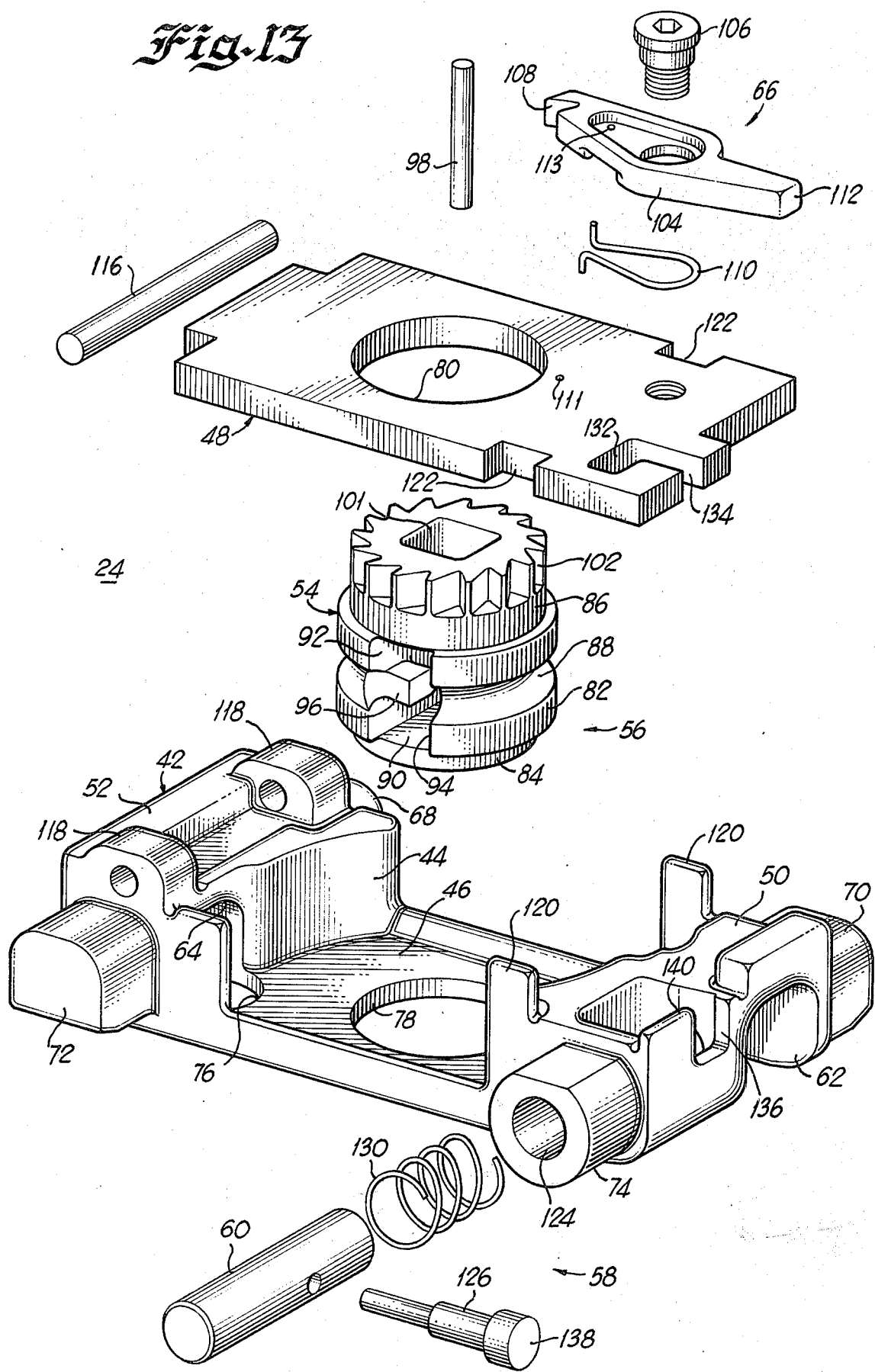

VEHICLE TIEDOWN WINCH

The present invention relates to a cargo tiedown device, and more particularly to a tiedown winch for securing loads such as automobiles to a transporting vehicle such as a railroad car.

For the transportation of automotive vehicles by rail, a vehicle is placed on the deck of a railroad car and then secured in position so that it will not be dislodged by vibrations and shocks during travel of the railroad car. A flexible tiedown member, typically a chain, is used to secure the vehicle. Normally the chain extends from an attachment point on the frame of the vehicle, and a tiedown winch carried by the deck of the car is used for holding the chain in a taut condition.

Since a transporting vehicle such as a railroad car should be able to accommodate vehicles or other loads of various sizes and shapes, it is desirable that the tiedown winch be movable along the car deck. An accepted solution to this problem is to provide one or more tracks in the deck along which one or more tiedown winches are slidably mounted. A locking mechanism such as a locking bolt engageable with openings in the track is used to secure the winch in a desired position.

A load securement system including a tiedown winch should be as compact and as low in profile as possible so as to create minimum obstruction of the car deck. Tiedown winches used in the past having chain takeup drums rotatable about a horizontal axis have failed to meet this goal because when chain is wrapped on the drum the height of the winch is substantial. A winch having a takeup drum rotatable about a vertical axis wherein the chain can extend in either direction from the drum has been proposed and provides a solution to this problem.

An important object of the present invention is to provide improvements in tiedown winches, and more specifically to provide improvements in tiedown winches having a takeup drum rotatable about a vertical axis from which the tiedown chain may extend in either direction. Other important objects of the present invention are to provide a tiedown winch that is convenient to use; to provide a tiedown winch of compact size and low profile; to provide a winch readily adaptable to many applications and capable of simplifying the securing of loads; and to provide a winch characterized by ruggedness, durability and ease of manufacture.

In brief, in accordance with the present invention, there is provided a tiedown winch including a housing slidable in a supporting track and defining a chamber between top and bottom walls and spaced end walls. A takeup drum is journalled in the top and bottom walls for rotation around a vertical axis. Each end wall is provided with a chain opening to the end that the chain can extend in either direction from the drum for attachment to a load to be secured.

In accordance with one feature of the present invention, the housing top wall comprises a hinged cover which may be raised to provide access to the drum and chamber. Thus, the chain may readily be extended through either end of the housing and attached to and detached from the drum.

In accordance with another feature of the invention, there is provided a locking mechanism serving both selectively to lock the cover in its closed position and to lock the housing against sliding movement in the track. The locking mechanism is provided with an intermediate position wherein the cover is maintained locked in its closed position while the housing is slidable in the track.

In accordance with another feature of the invention, the chain openings in the housing ends are provided with contiguous segments in the housing bottom wall extending from the end walls toward the takeup drum. This configuration permits the chain to extend along a low path and reduces the height requirement of the tiedown winch.

The present invention together with the above and other objects and advantages will appear from the following detailed description of the embodiment of the invention illustrated in the accompanying drawings, wherein:

FIG. 1 is a top plan view of a load securement system including a tiedown winch constructed in accordance with the present invention;

FIG. 2 is a side elevational view of the structure shown in FIG. 1;

FIG. 3 is a sectional elevation view taken along the line 3—3 of FIG. 2 and illustrating portions of the tiedown winch and track;

FIG. 4 is a sectional view taken along the line 4—4 of FIG. 2;

FIG. 5 is a sectional view taken substantially along the line 5—5 of FIG. 4;

FIG. 6 is a sectional elevation view taken along the line 6—6 of FIG. 5;

FIG. 7 is a sectional elevation view taken along the line 7—7 of FIG. 2 and, like FIGS. 1-6, illustrates the locking mechanism in the released position;

FIG. 8 is a sectional view taken along the line 8—8 of FIG. 7;

FIG. 9 is a fragmentary view similar to part of FIG. 7 illustrating the locking mechanism in its intermediate position;

FIG. 10 is a sectional view taken along the line 10—10 of FIG. 9;

FIG. 11 is a view similar to FIG. 9 illustrating the locking mechanism in the locked position;

FIG. 12 is a sectional view taken along the line 12—12 of FIG. 11; and

FIG. 13 is an exploded perspective view illustrating components of the tiedown winch in unassembled condition.

Having reference now to the drawings and inititally to FIGS. 1 and 2, there is illustrated a load securement system generally designated as 20 of a type useful for securing loads such as automobiles or other vehicles to a transporting vehicle such as a railroad car. The system 20 includes a track 22 slidably supporting a tiedown winch embodying the features of the present invention and generally designated as 24.

In a typical load securement arrangement in which the system 20 may be used, the track 22 is mounted within or upon a deck (not shown) of a railroad car. A chain 26 is attached to a load such as an automotive vehicle, and the chain is secured and tightened by the tiedown winch 24. In the illustrated arrangement, the system includes an idler device 28 through which the chain 26 extends between the winch 24 and the load. It should be understood, however, that the use of an idler device is not necessary, and that the chain 26 may extend outwardly and upwardly to the load directly from the tiedown winch 24.

The track portion of the load securement system 20 may take many forms. Normally, spaced apart and opposed track portions are provided between which and within which the tiedown winch 24 is slidably mounted. The track 22 is in the form of a channel and provides a convenient way of achieving this end. Track 22 in the illustrated arrangement includes a base wall 30 capable of being attached as by fasteners (not shown) to a railroad car deck. A pair of side walls 32 and 34 extend upwardly along the sides of the base 30, and a pair of inwardly extending flanges 36 and 38 capture the tiedown winch 24 within the channel track 22. In order to permit locking of the tiedown winch at selected positions along the track, a series of locking openings 40 are provided in the side wall 32 between the base 30 and the flange 36.

In general, the tiedown winch 24 of the present invention includes a housing or body generally designated as 42 having a central chamber or cavity 44 defined between a bottom wall 46 and a top wall or cover 48 and between a pair of end wall structures 50 and 52. Within the chamber 44, a winch or takeup drum 54 is mounted for rotation around a vertical axis. Chain 26 is releasably attached to the drum 54 by means of a chain attachment structure generally designated as 56. The chain attachment structure 56 is the subject of a copending application Ser. No. 760,869 of Emil J. Hlinsky filed on the same day as the present application. Reference may be had to that application for a further description (incorporated by reference herein) of the construction of the chain attachment structure 56 beyond that appearing below.

In order to secure the winch 24 at selected positions along the channel track 22, there is provided a locking mechanism generally designated as 58 and incorporating certain novel features of the present invention described below. The locking mechanism 58 includes a lock bolt 60 having a length substantially shorter than the width of the winch housing 42. From the drum 54, the chain 26 can extend in opposite directions through either of a pair of chain openings 62 and 64 formed in the end wall structures 50 and 52; the length of the bolt 60 accommodating the opening 52. Certain features of the arrangement of openings 62 and 64, bolt 60, and the housing 42 are the subject of a copending application Ser. No. 760,870 of Richard Edgar Hague filed on the same day as the present application. Reference may be had to that copending application for a description (incorporated herein by reference) of those features beyond that included in the present application.

When a load is secured by the tiedown winch 24, the chain is connected to drum 54 and extends outwardly through one of the chain openings 62 and 64 to be fastened to the load either directly or through the idler 28. The winch 24 is positioned along the channel track 22 in a desired position where it is retained by means of the locking mechanism 58. The drum is rotated to tighten the chain, and is thereafter releasably held in position by means of an antireverse mechanism generally designated as 66.

Proceeding now to a more detailed description of the structure of the tiedown winch 24, the housing 42 with the exception of top wall 48 is formed as a sturdy unitary casting incorporating the bottom wall 46 and the end wall structures 50 and 52. The housing 42 is formed so as to be retained within and slidable along the channel track 22. In the illustrated arrangement, this is accomplished by the provision of four lugs 68, 70, 72 and 74 extending outwardly from the opposite sides of the end wall structures 50 and 52. The lugs are slidably received below the flanges 36 and 38 of the channel track 22 between the side walls 32 and 34.

It is desirable to minimize the size and the vertical height of the tiedown winch 24 in order not to obstruct the deck area of the transportation vehicle with which the winch is used. In accordance with one feature of the invention, the vertical height is minimized by the configurations of the chain openings 62 and 64. In addition to that portion of each opening extending in a horizontal direction endwise through the end wall structures 50 and 52, each opening further includes a contiguous segment 76 in the bottom wall 46. Each of these segments 76 extends from the end of the housing inwardly through a substantial portion of the distance from the end of the housing to the drum 54. This configuration provides clearance for the chain at the end wall structures 50 and 52 to the base 30 of the channel track 22, and permits the end wall structures 50 and 52 to be of lower height than if this clearance were not provided.

Further to provide a compact assembly, the housing 42 does not include side walls. The open sides of the chamber 44 provide clearance for winding of the chain 26 upon the drum 54. In addition, as best seen in FIG. 4, the chamber 44 as defined between the end wall structures 50 and 52 is generally circular and concentric with the drum in order to accommodate wrapping of the chain around the drum.

The bottom and top walls 46 and 48 of the housing 42 are provided with circular openings 78 and 80 in which the drum 54 is journalled for rotation. The drum is preferably formed as a unitary part including a central portion 82 of enlarged diameter captured between the walls 46 and 48, and reduced diameter stub portions 84 and 86 received in the openings 78 and 80. In order to guide the chain on the drum, the central portion 82 is encircled by a groove 88.

As indicated above, the chain 26 is releasably attached to the drum 54 by the chain attachment structure 56 described in detail in the above noted copending application of Emil J. Hlinsky. The end link of the chain is inserted into a recess 90 extending inwardly from the periphery of the drum and defined in part by a pair of interfacing walls 92 and 94. Within the recess 90 and extending from the wall 92 is an integral lug 96 sized to be received within the end chain link. Clearance is provided between the end of the lug 96 and the wall 94 to provide a path for entry of the chain link into the recess and over the lug 96. After the chain link is inserted over the lug, a keeper in the form of a pin 98 is inserted into the drum 54 through an opening 100. The pin 98 blocks the path of the chain link, while loads applied by the chain 26 to the drum 54 are carried directly by lug 96 and not by the pin 98.

After chain 26 has been attached to the drum 54 and to the load to be secured, the chain is tightened by turning the drum. Rotation of the drum 54 in order to take up the chain 26 is accomplished by engagement of a key (not shown) in a socket 101 formed in the upper surface of the drum.

To prevent unwinding of the chain 26 after securement of a load, the antireverse mechanism 66 is provided. The uppermost end of the drum 54 comprising an extension of the stub portion 86 is formed as a ratchet gear 102. A pawl lever 104 is pivotally mounted on the cover 48 by means of a pivot screw 106. Lever 104 includes a tooth engaging structure 108 biased toward the ratchet gear 102 by means of a pawl spring 110 with its ends received in openings 111 and 113 in the cover 48 and lever 104 respectively (FIG. 13). When the chain has been wound, the spring 110 biases the structure 108 into engagement with the gear 102 to prevent reverse rotation of the drum 54. To release the pawl for unwinding of the chain, the lever 104 is pivoted by pushing against an extension 112 of the pawl lever 104.

In accordance with a feature of the invention, the cover 48 of the housing 42 is movable to provide access to the chamber 44 and to the drum 54. This facilitates the release and connection of the chain 26 and drum 54 as well as the feeding of the chain through a selected one of the chain openings 62 and 64. Moreover, since the cover is narrower than the distance between the channel track flanges 36 and 38 (FIGS. 1 and 7) it is possible to remove the drum 54 and to install and attach the chain 26 while the winch 24 is within the track 22.

In order to permit opening of the cover 48, it is pivotally connected to the remainder of the housing 42 by means of a hinge pin 116 attached by welding to the end of cover 48 and received in a pair of hinge knuckles 118 formed integrally with the end wall structure 52. In order to guide and hold the cover 48 in its closed position, the cover is embraced between a pair of arms 120 extending upwardly from the end wall structure 50 into slots 122 in the cover 48. A partially open position of the cover 48 is illustrated in broken lines in FIG. 8.

An important aspect of the present invention relates to the structure of the locking mechanism 58. This single locking mechanism including lock bolt 60 serves the dual functions of locking the housing 42 against sliding movement in the channel track 22 and of locking the cover 48 in its closed position. Moreover, in accordance with a feature of the invention, the locking mechanism can assume an intermediate position wherein the cover 48 is locked closed yet the winch 24 can be slidably moved along the track.

More specifically, the lock bolt 60 is reciprocally slidable in a cylindrical recess 124 provided in the end wall structure 50. A convenient and compact arrangement is provided because the recess 124 extends outwardly through the lug 74. In a retracted condition (FIGS. 1–10) the bolt does not interfere with free sliding motion of the winch 24 within the channel track 22. When extended (FIGS. 11 and 12) the bolt is received within a selected one of the openings 40 in order securely to lock the winch 24 in place at a selected position along the channel track 22.

Bolt 60 is moved to its retracted position by means of an operating pin 126 slidable in a slot 128 communicating with the recess 124, and is biased outwardly to the locking position by means of a spring 130 held in compression within the recess 124 against the operating pin 126. The slot 128 includes a portion 132 parallel with bolt 60 formed in the cover 48 and a right angle portion 134 extending to the end of the cover 48. In the closed position of the cover, the portion 134 communicates with a slot 136 formed in the outermost wall of the end wall structure 50. In combination, the portions 132, 134 and 136 provide the slot 128 with an L-shape in the nature of a bayonet lock.

Due to the generally L-shape of the slot 120 including portions 132, 134 and 136, the bolt is movable in two directions. From its locked or fully extended position (FIGS. 11 and 12) the bolt 60 is moved in the direction of its axis and compresses spring 130 as pin 126 slides along the slot portion 132. When the pin reaches the junction of slot portions 132 and 134, the bolt 60 is then rotated about its axis as pin 126 moves through slot portion 134 and then into slot portion 136. When pin 126 is seated in slot 136 (FIGS. 7 and 8), the bolt 60 is fully retracted. The force provided by spring 130 is substantially parallel to the bolt axis, and is thus substantially normal to the plane or direction of rotation of the bolt. Consequently, the spring force results in frictional retention of the bolt 60 in the retracted position.

Pin 126 includes an enlarged head portion 138 functioning to retain the cover 48 in its closed position. More specifically, when the bolt 60 is in its locked position and when the operating pin 126 is received in the slot portion 132 (FIGS. 11 and 12), the head 138 overlies the cover 48 and prevents it from being raised. Thus, in this position, not only is the winch housing 42 secured against sliding but also the cover 48 is secured against being raised.

When the bolt is retracted and latched in the retracted position, the operating pin is received in the slot portion 136. In this position (FIGS. 7 and 8), the head 138 is clear of the cover. Consequently, in this position the housing is not only slidable along the channel track, but also the cover 48 can be raised for access to the chamber 44 and the drum 54.

In accordance with a feature of the invention, the locking mechanism can also assume an intermediate position illustrated in FIGS. 9 and 10. More specifically, the interfacing ends of slot portions 134 and 136 are staggered and a corner 140 of the end wall structure 50 at the mouth of the slot portion 136 forms a detent. As the operating pin 126 is rotated up from the position shown in FIGS. 7 and 8 along the slot portion 136, the pin snaps over the corner 140 under the resilient force of the spring 130. Corner 140 forms a detent at the mouth of the slot portion 134 and the pin 126 nests in this detented position due to the force applied by the spring 130. In this intermediate position, the head 138 overlies the cover 48 (see FIG. 10), while the bolt 60 is in its retracted position. Consequently, in this intermediate position, the winch 24 can be moved along the channel track 22, yet the cover 48 remains locked closed. This position is useful for adjusting the position of the winch after the chain has been installed and fed through a selected one of the openings 62 and 64. After the chain has been interconnected with a load and the winch 24 has been located as desired, the operating pin can then be moved through the rest of its range of movement to the fully locked position illustrated in FIGS. 11 and 12.

Idler device 28 slidably receiving chain 26 may be used to provide a selected chain angle toward the load, and to permit the tiedown winch 24 to be positioned a substantial distance from the load. When idler 28 is used, the chain extends horizontally from the tiedown winch. If desired, the idler device 28 may be omitted and the chain 26 may extend at an angle to horizontal directly to the load. The idler includes a body 142 having lugs 144 slidably received in the channel track 22 and is secured in the track by a spring biased bolt 146 operable by a pin 148 movable in an L-shaped slot 150. Chain 26 extends into the body 142 through an opening in its end (not shown) and exits from the body through a top opening 152.

While the present invention has been described with reference to details of the illustrated embodiment, it should be understood that such details are not intended to limit the scope of the invention as defined in the following claims.

What is claimed and desired to be secured by Letters Patent of the United States is:

1. A tiedown winch of the type slidable in a channel track comprising a body, a chamber in said body, a takeup drum rotatably mounted in said chamber, a cover for said chamber movable from a closed position to an open position to permit access to said drum, an elongated flexible tiedown member having an end affixed to said drum, and a locking mechanism supported for movement in said body, said locking mechanism including a first portion engageable with said channel track for locking said body against sliding in the channel track and having a second portion engageable with said cover for locking said cover in said closed position, said locking mechanism being movable relative to said body between a first position wherein both said body and cover are locked and a second position wherein said body is released for sliding movement in said channel and said cover is released for movement from said closed position.

2. A tiedown winch as claimed in claim 1, said locking mechanism being movable to a third position wherein said cover is locked and said body is released.

3. A tiedown winch as claimed in claim 2, said body including a plurality of openings through any one of which said tiedown member can be fed from said chamber with said cover in the open position.

4. A tiedown winch as claimed in claim 2, said locking mechanism being movable in one direction between said first and third positions and in another direction between said second and third positions.

5. A tiedown winch as claimed in claim 2, further comprising spring means urging said locking mechanism in said one direction toward said first position from said third position.

6. A tiedown winch as claimed in claim 5, further comprising detent means cooperating with said spring means for releasably retaining said locking mechanism in said third position.

7. A tiedown winch for use in a supporting track having two elongated parallel spaced apart track portions, said winch comprising:
a generally box-like housing including spaced generally rectangular top and bottom walls;
spaced apart end wall structures joining the opposed ends of said top and bottom walls;
a central chamber defined between said top and bottom walls and between said end wall structures;
a drum mounted for rotation in said chamber for rotation around an axis generally normal to said top and bottom walls;
an elongated flexible tie member having one end attached to said drum for winding on said drum in said chamber;
said housing including laterally extending portions adapted to be slidably received in said track portions to support said housing for end-wise sliding movement along said supporting track;
locking means supported on said housing adapted to engage the supporting track for securing said housing against sliding movement;
and the improvement characterized by:
said drum being journalled for rotation in said top and bottom walls;
hinge means interconnecting said top wall and said housing for permitting said top wall to move between closed and open positions; and
manually operable latch means for holding said cover in the closed position.

8. The tiedown winch of claim 7, said drum including concentric cylindrical portions adjacent its opposite ends, and circular holes in said top and bottom walls receiving said cylindrical portions for rotatably supporting said drum in said chamber.

9. The tiedown winch of claim 8, a ratchet gear formed on the top of said drum and extending above said top wall in the closed position of said top wall, and a pawl mounted on said top wall for engagement with said gear.

10. A tiedown winch for use in a supporting track having two elongated parallel spaced apart track portions said winch comprising:
a generally box-like housing including spaced generally rectangular top and bottom walls;
spaced apart end wall structures joining the opposed ends of said top and bottom walls;
a central chamber defined between said top and bottom walls and between said end wall structures;
a drum mounted for rotation in said chamber for rotation around an axis generally normal to said top and bottom walls;
an elongated flexible tie member having one end attached to said drum for winding on said drum in said chamber;
said housing including laterally extending portions adapted to be slidably received in said track portions to support said housing for end-wise sliding movement along said supporting track;
locking means supported on said housing adapted to engage the supporting track for securing said housing against sliding movement;
and the improvement characterized by:
said drum being journalled for rotation in said top and bottom walls;
hinge means interconnecting said top wall and said housing for permitting said top wall to move between closed and open positions;
manually operable latch means for holding said cover in the closed position; and
wherein said locking means and said latch means comprise a movable unitary structure mounted on said housing.

11. The tiedown winch of claim 10, said movable structure being movable between first and second positions, said housing being secured and said top wall being held closed in said first position, said housing and said top wall being released in said second position.

12. The tiedown winch of claim 11, said movable structure being movable to a third position wherein said housing is released and said top wall is held closed.

13. The tiedown winch of claim 12, said third position being an intermediate position between said first and second positions.

14. A tiedown winch of the type slidable in a channel track having locking openings therein, said winch comprising a body having portions captured within the track, a chamber within said body, a top wall covering said chamber, a hinge at one end of said body coupling said top wall to said body for pivotable movement between closed and open positions, a takeup drum rotatably mounted within said chamber, an elongated flexible tiedown member having an end affixed to said drum, a transverse recess in said body adjacent the end of said body opposite said hinge, a lock bolt slidable in said transverse recess between a retracted position and an extended position in which the lock bolt selectively engages a track locking opening, an operating pin extending from said lock bolt, a slot having a first portion defined by said body and a second portion defined by said top wall capturing said operating pin for movement along a path having axial and circumferential components relative to said lock bolt, and an enlarged segment of said operating pin larger than said second portion of said slot defined by said top wall, said enlarged portion being spaced from said lock bolt and overlying said top wall for preventing movement of said top wall from the closed to the open position when said pin is in said second portion of said slot.

* * * * *